Patented Aug. 8, 1944

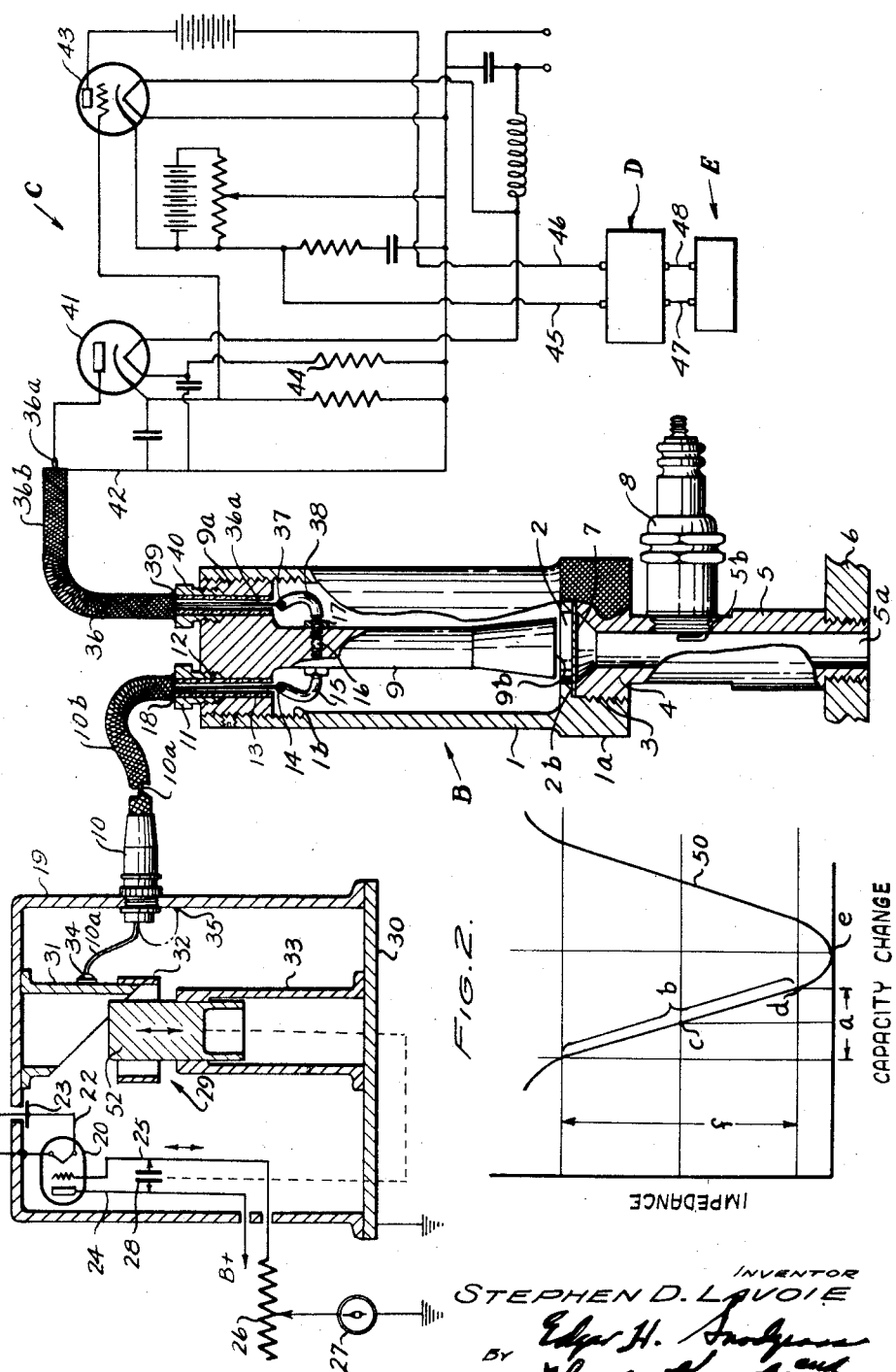

2,355,088

UNITED STATES PATENT OFFICE 2,355,088

PRESSURE INDICATOR

Stephen D. Lavoie, Long Branch, N. J.

Application August 25, 1942, Serial No. 456,035

5 Claims. (Cl. 178—44)

(Granted under the act of March 3, 1883, as amended April 30, 1928; 370 O. G. 757)

The invention described herein may be manufactured and used by or for Government for governmental purposes, without the payment to me of any royalty thereon.

This invention relates generally to the art of micro measurement and indication with respect to physical elements, and more particularly, to the provision of a novel method and apparatus utilizing electrical means for accomplishing such measurement and indication. The invention embodies a method and apparatus for translating pressure or motions into fluctuations in an electric circuit.

The embodiment of my invention herein shown has particular application to the measurement and indication of gas pressures such as those resulting from explosive forces, although other applications will be apparent to those skilled in the art.

The principal object of my invention is to provide a method and apparatus enabling more accurate measurement and indication than have been possible with methods and apparatus heretofore used.

One of the objects of my invention is the provision of a method and apparatus for study of explosion pressure phenomena which will enable more accurate determination of the pressure, produced by an explosive force, existing at a given time.

The invention has special application to the study of pressure phenomena resulting from explosive forces such as those occurring within the cylinder of an internal combustion engine, one example being the study of so-called "detonation" pressures produced under certain conditions by such explosive forces. In the operation of internal combustion engines, for instance, a condition of detonation familiarly called "engine ping" occurs under certain conditions indicative of inefficient operation of the engine. For the purpose of correcting this inefficient condition it is desirable to determine accurately the exact point in the engine cycle and/or during the explosion cycle, at which detonation occurs, and it is therefore an important object of this invention to provide a method and apparatus which will enable such determination with greater accuracy. Such location of the point at which detonation occurs is important in studying the effects of changes in design of internal combustion engines and in comparing the effects of using different types or grades of fuel.

Another object of my invention is the provision of a method and apparatus for studying explosion pressure phenomena which will enable more accurate indication and measurement of the pressure produced by an explosive force at a given time under a condition where the variation in explosion pressure is very small with respect to the time during which such pressure variation occurs.

Another object of my invention is the provision of apparatus for studying physical pressure phenomena which is capable of calibration by a static method.

Another object of my invention is the provision of a method and apparatus for the purpose described which will enable calibrations once made to be maintained for a considerable period.

An important feature of my invention involves the utilization of a resonant circuit to translate physical pressures into an electrical medium by a method involving varying the deviation of the resonant frequency of this resonant circuit from the frequency of the voltage applied thereto.

Another object of my invention is to provide pressure translating means comprising a highly stable, high Q, ultra high frequency resonant circuit capable of accomplishing the results above mentioned with respect to more accurate analysis of physical pressure phenomena.

Another object of my invention is the provision of pressure translating means comprising a highly stable high Q, ultra high frequency resonant circuit capable of response to physical pressure variations and which circuit is embodied in a self-contained unit of small compass, readily portable and unaffected by ambient factors, said device including means for applying physical pressures to the circuit in such a manner as to affect a change therein.

In carrying my invention into practice a resonant circuit is provided, preferably a highly stable, high Q, ultra high frequency resonant circuit as embodied in the resonator of my invention. Alternating current is applied to said resonant circuit, preferably from an alternating voltage source comprising a high Q, highly stable, ultra high frequency oscillator circuit. A deviation is effected between the frequency of the alternating voltage source and the resonant frequency of the resonant circuit and this is preferably accomplished by maintaining the voltage of the alternating voltage source at constant amplitude and frequency and tuning the resonant circuit away from the frequency of the applied voltage. Physical pressures are then made effective upon the resonant circuit to vary the deviation of the resonant frequency of the resonant circuit from the frequency of the applied voltage and consequently to vary the amplitude of the resulting current output of the resonant circuit, which current output is proportional to the effective physical pressures. This current output is then caused to be rectified, amplified and applied to a cathode ray oscillograph, or other suitable reproducing means, for the purpose of studying the physical pressure variations.

For the purpose of embodying my invention in physical form I provide pressure translating means comprising a highly stable, high Q, ultra high frequency resonant circuit of novel form and arrangement, including physical pressure responsive means and comprising a self-contained resonator detector unit adapted for connection to an explosion chamber, such as the cylinder of an internal combustion engine.

The resonator detector device of my invention has its component parts so constructed and proportioned that the inductance has an extremely high value in comparison to the capacity and the entire circuit has an extremely low resistance, resulting in a circuit of high Q; the electrical field of the resonant circuit is confined entirely within a housing comprising an element of the resonant circuit; and the mechanical elements are of such construction and cooperative arrangement that the device is of small compass and high mechanical stability. The construction of the device is such that it is substantially stable electrically and mechanically, and extremely sensitive to pressure variations or frequencies desired to be studied. Consequently the resonator detector device of my invention is capable of detecting and enabling measurement of pressure variations which are very small with respect to the time within which such changes occur; the device may readily be calibrated statically and is capable of maintaining its calibrations for long periods. While the device is extremely sensitive, it is not affected by ambient factors.

Other objects, advantages and features of novelty will appear more fully as the description of the invention progresses in conjunction with the accompanying drawing, in which:

Fig. 1 is a view partly diagrammatic of apparatus embodying my invention and showing the resonator detector device in section.

Fig. 2 is a graph of the impedance curve of the resonator device showing where the impedance change, due to physical pressure variation, takes place in reference to the curve.

The method employed in the practice of my invention involves the modulation of a carrier wave to vary the same in accordance with variations in physical pressure as, for instance, those produced by explosive forces within an explosion chamber such as the combustion chamber of the cylinder of an internal combustion engine. For the purposes of my invention I employ a resonant circuit which includes means responsive to explosive pressures for affecting the output of said circuit and I employ a source of alternating voltage for applying an unmodulated wave to the resonant circuit which in turn modulates the carrier wave in accordance with variations of physical pressures being studied. The characteristics of the modulated wave may then be analyzed by suitable means, such as a cathode ray oscillograph or other suitable wave analyzer.

The drawing illustrates an application of the principles of my invention to the study of explosive pressures produced within an internal combustion engine cylinder.

For the purposes of this application of my invention, illustrated in the drawing, I provide pressure translating means comprising a resonator-detector device, generally indicated by the letter B, which embodies a resonant circuit including means responsive to explosive pressures for affecting the output of such circuit. For the purpose of providing a carrier wave to be modulated by the explosive pressures affecting the resonant circuit, I provide a suitable source of alternating current such as the oscillator device generally indicated by the letter A in the drawing, the output of which is applied to the resonator circuit comprising the resonator detector B.

After the carrier wave supplied by the oscillator A has been modulated by the resonator-detector device B responsive to physical pressures being studied, the current output of the resonant circuit of the resonator detector device B is applied to a suitable rectifying and amplifying circuit, such as generally indicated by the letter C, and the rectified current passing through this circuit C is applied to a suitable reproducing means for rendering electrical variations perceptible. This means, generally indicated by the letter D, may comprise a cathode ray oscillograph or other means suitable for this purpose.

E represents any suitable means for supplying a synchronizing voltage to the reproducing means D, for establishing a timing relation between the physical pressure variations affecting the output of the resonator device B and the time when such pressure variations occurs.

If the reproducing means employed is a cathode ray oscillograph, the output voltage of the circuit C may be applied to one pair of deflecting plates of the cathode ray oscillograph and the other pair of the deflecting plates thereof may have applied thereto a synchronizing voltage supplied by the means generally indicated by the letter E. The means E may be connected for operation by some timing means such as the crank shaft of the engine producing the explosive pressures being studied. Thus, for instance, if the resonator B is associated with the cylinder of an engine so as to be affected by the explosive pressures in such cylinder, the means E may be associated with the crank shaft or other repeating function of such engine so that a timed relation may be established between the explosion pressure in the cylinder and the crank angle.

The embodiment of my resonator detector device shown in the drawing, and generally indicated by the letter B, comprises an outer element or housing 1 formed of metal or other suitable electrically conductive material. The base 1a of the housing element 1 is provided with a passage 2, the outer end of which is threaded, as at 3, to receive the threaded end 4 of an adapter element 5 for connecting the entire device B to an explosion chamber such as the interior of the combustion cylinder 6 of an internal combustion engine. A diagram 7 is firmly positioned against a shoulder 2b, provided in the passage 2, by engagement of the inner end 4 of the adapter element 5 with said diaphragm 7. This adapter element 5 is provided with a passage 5a communicating with the interior of the cylinder 6 so as to enable the pressure of the gases within the chamber 6 to effect a distortion of the diaphragm 7. A spark plug 8 is screwed into a suitable opening 5b provided in the adapter element 5 so as to provide means for igniting the gases in the explosion chamber in communication with the passage 5a.

The upper end of the housing 1 is threaded, as at 1b, to receive the threaded upper end 9a of an inner element 9 positioned within the housing 1. The element 9, which may be termed a capacity element, is formed of metal or other electrically conductive material and has its lower end 9b spaced from the diaphragm 7.

The housing element 1 and the inner element 9 are preferably composed of some material whose modulus of elasticity does not change with temperature, such as Elinvar, and the surfaces of these elements may preferably be coated with a low resistance material such as silver or copper.

For coupling the resonator device B to the oscillator A, a conductor 10 comprising a concentric cable is employed. This conductor 10 may be of a well-known type now in use comprising a central conductor wire 10a and an outer circular conductor comprising the metal loom 10b insulated from the central conducting wire 10a. The conductor 10 is connected to the resonator B through a suitable coupling means comprising an apertured member 11 screwed into the outer end of a passage through the upper portion 9a of the element 9 as indicated at 12.

Member 11 may be made of metal or other suitable electrically conductive material, and is provided with an insulating bushing 13 extending through the upper end 9a of the element 9 and insulating therefrom the leading portion of the center wire 10a.

The leading end of the wire 10a which is brought into the interior of the housing 1 and secured, as by soldering, as indicated at 14, to a coupling loop 15 formed of metal or other suitable electrically conductive material and conductively connected with the shank portion of the inner element 9 as by threading one end of said coupling 15 into a threaded passage 16 provided in the member 9. The loop 15 may further be more firmly secured to the member 9 by providing a nut 17 threaded on to the loop 15 and tightly engaging the shank portion of member 9.

As shown in the drawing, the outer conductive element, comprising the metal loom 10b, is conductively connected to the elements 1 and 9 by soldering the loom 10b to the member 11, as indicated at 18.

The conductor 10 is suitably associated with the oscillator circuit A in a manner hereinafter described.

The oscillator device diagrammtically illustrated in the drawing and generally indicated by the letter A is described in detail in my copending application Serial No. 405,520, filed August 5, 1941, for Oscillatory apparatus, and that application is referred to for a more detailed description thereof, it being understood that for the purposes of the present invention the specific oscillator illustrated is merely exemplary. As shown, this oscillator A comprises a metal housing 19 in which is mounted an oscillator tube 20, the filament lead 21 of which contacts with the metal housing 19 and after passing therethrough connects with a suitable source of alternating current. The other filament lead 22 likewise passes through the housing 19 to the source of current, but is insulated from direct contact with the housing although the lead 22 is capacitively associated with the housing through the metal plate 23. The plate lead 24 and the grid lead 25 each include a brass rod, which rods act as a pair of Lecher wires to form with the vacuum tube 20 a long line oscillator circuit. The plate lead 24 is connected to a suitable source of plate current and the grid lead 25 is connected to a variable grid bias resistor 26 through a suitable grid current meter 27 to ground. A radio frequency short circuiting member or condenser 28 is provided across the Lecher wires to which the plate and grid leads, 24 and 25 respectively, are connected and said condenser 28 is enabled to be moved along said Lecher wires for tuning the oscillator circuit.

A variable lumped capacity structure generally indicated at 29 is mounted within the housing 19 between the rear wall thereof and the front cover plate 30. This variable capacity element 29 comprises a plurality of concentric tubular members 31, 32 and 33, all mounted on a common axis, and a piston-like plunger member 52 slidably mounted within the member 33 for movement toward and away from the members 31 and 32. Suitable means is provided for moving the plunger 52 in and out of the member 33 and for synchronously moving the condenser 28 relative to the Lecher wires for tuning the oscillator throughout the frequency range.

Resonator device B has the resonant circuit thereof suitably coupled to the oscillator A through the conductor 10, as shown, by connecting the center conducting wire 10a directly to the capacity element 31, as at 34, or alternatively, the center conductor 10a may be coupled through a loop to the housing 19 as indicated at 35. The outer conducting element 10b may be conductively connected to the housing 19.

A concentric cable conductor 36, similar to cable 10, is provided for coupling the output of the resonator B to the rectifier and amplifier circuits, generally indicated at C. The central conductor wire 36a of conductor 36 is brought in through and insulated from the upper portion 9a of the element 9 and connected at 37 to a loop conductor element 38, similar to loop 15, which is threaded into the shank of the element 9 as described with reference to the loop 15. The outer conductor element comprising the metal loom 36b is soldered as at 39 to the threaded coupling member 40 so as to be conductively associated with the element 9 and with the housing 1.

The other end of the conductor 36 is connected so as to apply the current output of the resonator detector device B to the rectifier and amplifier circuit generally indicated by the letter C, as shown, the center wire 36a being connected to the plate circuit of the detector tube 41 and the outer conductor comprising the metal loom 36b being connected to wire 42 comprising one side of the current source for operation of circuit C.

The current output of the resonator B after being rectified in the detector circuit including the tube 41, is amplified by the direct current amplifier circuit including tube 43, and this amplified current is applied through wires 45 and 46 to the wave analyzer D which will measure variations in amplitude of current output of resonator B effecting the change in voltage across resistor 44.

The resonator-detector unit B comprises an ultra high frequency resonant circuit intermediate the oscillator A and the rectifier amplifier circuit C, and this resonant circuit has its electrical field confined entirely within the housing. Included in this resonant circuit are the elements 1, 9, 7, 15 and 38 which function both inductively and capacitively in the circuit and the form and proportions of these elements affect the total impedance of the circuit. These elements are so designed that the inductance of the entire circuit has a high value compared to the capacitance so that the circuit has a high value of Q. Moreover, the elements 7 and 9 are so designed that the capacity between them has a large value compared to the distributed capacity of the circuit. Desirably, the impedance of the loops 15 and 38 is matched to the impedance of the conductors 10 and 36 associated respectively therewith. These factors make the resonator B highly sensitive and highly stable mechanically and electrically as well.

The diameter and thickness of the diaphragm 7 are dimensioned so as to have a high degree of sensitivity to physical pressures—that is, capable of a distortion material affecting the impedance of the circuit responsive to small variations in physical pressures while at the same time the limits of distortability of the diaphragm confine the ultimate impedance variation, due to such distortion, within the limits of the linear portion of b of the resonance curve 50 of the resonator B, as illustrated in Figure 2. This serves to increase the accuracy of results obtained because, so long as the impedance variation is confined to the straight line portion of the resonance curve, the variation of sensitivity is slight over the range of frequencies covered thereby. In other words, the device has substantially the same sensitivity to all physical pressures corresponding to the frequencies in that range.

Figure 2 shows the impedance curve of the resonator detector device B of my invention, illustrating how the same is tuned to permit the capacity variation, due to the distortion of the diaphragm 7 responsive to variations in the explosive pressures being studied, to be confined to the straight line portion of the curve 50.

The diaphragm 7 is designed so as to permit a variation of capacity, due to its distortion, to an extent indicated by the length of the line a. With the resonator device B tuned to a point c, approximately half way up the straight line portion b of the curve 50, the maximum variation of operating capacity due to distortion of the diaphragm is confined to the straight line portion b of the curve 50. The impedance variation, corresponding to the capacity variation c, is represented by the line f.

In the operation of the apparatus illustrated in Figure 1 in accordance with the method of my invention, the pressure translating means or resonator device B is operatively connected with engine cylinder 6 as shown. The ultra-high frequency oscillator circuit, generally designated by the letter A, is caused to supply a constant voltage at a constant frequency to the resonant circuit embodied in the device generally indicated by the letter B. The resonant circuit of this device is then tuned by adjusting the distance between the diaphragm 7 and the end 9b of the element 9 to vary the operating capacity so that the resonant frequency of the resonant circuit is deviated from the frequency of the applied voltage. This tuning is accomplished by rotating the element 9 relative to the housing 1, these elements having threaded connection as above mentioned for this purpose.

Conveniently the tuning of the resonant circuit embodied in the device B may be accomplished by first tuning this device to resonance with the frequency of the applied voltage by adjusting the distance between the diaphragm 7 and element 9 to vary the operating capacity until maximum current output of the resonant circuit results, and then readjusting the distance between the diaphragm 7 and element 9 to vary the capacity until the current output of the resonant circuit is approximately one-half its maximum current output at resonance. In other words, resonator device B comprising the resonant circuit is finally tuned so as to have its resonant frequency at the point c approximately half way up the straight line portion b of the resonance curve 50 (Figure 2) so that the initial deviation of the resonant frequency of device B from the frequency of the applied voltage is indicated on the curve 50 in Fig. 2 by the distance between the point c and the point of resonance e, the latter denoting impedance of the resonant circuit at the point of resonance with the frequency of the applied voltage. The variation in operating capacity to secure this initial deviation is represented on Figure 2 by one-half the length of line a. When the resonator has been tuned as above described, the diaphragm 7 is caused to be distorted by the application of the pressures of gases within the cylinder 6 in communication with the diaphragm 7 through the passage 5a of the adapter 5, the variations in gas pressure being produced by explosions within the cylinder 6. These variations in gas pressures produce a corresponding variation in the operating capacity of device B by distortion of the diaphragm 7 and this variation in operating capacity resulting from distortion of the diaphragm 7 correspondingly produces a variation in the amplitude of the resulting current output of the resonant circuit which is applied through the conductor 36 to the circuit C as above described. The variation in current output from the resonator device B effects a corresponding variation in the potential difference across the resistor 44. The current output from the resonator device B through conductor 36 and the potential difference across the resistor 44 are proportional to the pressure of gases within the explosion chamber of the cylinder 6.

It will be understood that for accurate measurement of gas pressures and of variations of gas pressures to be referable only to the explosion chamber of the cylinder 6, the cubic area of the passage 5a and the adapter 5 will have to be taken into consideration in making initial calibrations. It is possible, however, due to the nature and construction of the resonator device B to make this resonator of such dimensions that it may be used in conjunction with the spark plug 7 without increasing the volume of the explosion chamber of the cylinder 6. This is highly desirable from the standpoint of securing the measurement of explosion pressures corresponding to actual conditions of operation so as to insure that no errors are introduced.

The current output of circuit C is applied through wires 45 and 46 to a suitable wave analyzer represented by the letter D which may comprise a cathode ray oscillograph or other suitable means. If a cathode ray oscillograph is employed, the current output of the circuit C will be applied by wires 45 and 46 to one set of deflecting plates of the oscillograph D, and the synchronizing voltage from the means E will be applied through the wires 47 and 48 to the other set of deflecting plates of the cathode ray oscillograph, the means E being associated with the engine comprising cylinder 6 in such a manner as to provide a timed relation between some repeating function of the engine, such as the crank shaft, and the time of creation of a given pressure of gas within the cylinder 6. Thus the beam of the cathode ray oscillograph may be deflected by one set of deflecting plates responsive to the pressure of gas at a given time existing within the explosion chamber of the cylinder 6, and, simultaneously, the beam of the cathode ray oscillograph will be deflected by the other set of deflecting plates responsive to variations in the crank angle, indicative of the position of the piston within the cylinder. Consequently, the position of the beam on the screen of the oscillograph will indicate the pressure of gases within the cylinder 6 at a given time and the trace made by said beam will indicate variations in such gas pressure and the period of time within which such variations take place. Since the construction of the resonator B permits a large variation in the operating capacity without introducing non-linearity and therefore permits the use of a highly sensitive diaphragm 7, very small variations in pressure occurring within very short periods of time may be accurately measured by the use of my invention. The graph made by the oscillograph will therefore enable more accurate determination of the time of detonation with respect to the position of the piston in the engine cylinder, when the apparatus is used for this purpose.

The initial deviation between the resonant frequency of the resonator device B and the frequency of the applied voltage may, if desired, be accomplished by varying the frequency of the applied voltage by tuning the oscillator circuit rather than tuning the resonator B. However, the method of varying the initial deviation by maintaining the frequency of the applied voltage constant and tuning the resonator B is preferred as more satisfactory results are thereby procured.

In so far as the mechanical stability of the resonator device B is concerned, this is effected by its simplicity of design, rugged construction and minimum of moving parts, the diaphragm 7 being the only moving part after the apparatus has been set up for a test. This diaphragm is securely locked against unauthorized movement by the construction provided.

Diaphragm 7 is preferably made of some material, such as Elinvar, whose elasticity will not be affected by changing temperature. It is necessary that this diaphragm be sensitive to the frequencies or pressure variations being studied and insensitive to other extraneous vibrations. The diaphragm is, therefore, made of fairly heavy material to withstand the high pressures to which it is subjected which are up to 5,000 pounds per square inch.

For the purposes of tests of the method and apparatus of the invention operating frequencies of the order of 400 megacycles were used as the frequencies of the voltage applied to the resonator device B.

Because of its high stability, the resonator B of my invention is capable of being calibrated by a static method. Once calibrations are made they are capable of being maintained for a considerable period.

The foregoing features are of importance in connection with the uses of the apparatus of my invention for which it is particularly designed. For instance, the apparatus of my invention is particularly suited to the study of pressure variations occurring at high frequencies known as detonation pressures. The condition of detonation produced in an internal combustion engine cylinder known as "engine ping" is indicative of inefficient operation and loss of power. For the purpose of studying the effects of use of different grades of fuel and changes in engine design in overcoming the inefficient operation indicated by a condition of detonation, it is desirable to ascertain with a high degree of accuracy the point in the engine cycle at which detonation occurs. By reason of the high mechanical and electrical stability of the apparatus of my invention, I am enabled to determine this point with greater accuracy.

It is also desirable to ascertain with a high degree of accuracy the exact pressure produced by the explosive force existing at a given time.

In order to eliminate error in determining the point at which detonation occurs and the pressure of the explosive force existing at such time, it is necessary to insure that the explosive pressures being studied are the only factors affecting variations in the indicating means; that the indicator shows the actual time relation between the existence of a given pressure and the time of its occurrence; and that a sufficient degree of movement be imparted to the indicator or reproducing means pursuant to small variations in the explosive pressure to enable observation upon the indicator of such small variations in explosive pressure.

The resonator detector device of my invention is characterized by its high quality of selectivity with respect to its response to the particular pressure frequencies being studied to the exclusion of all other extraneous factors tending to introduce a source of error. At the same time the device is highly sensitive to a small variation in the particular pressures being studied so that a sufficiently observable movement is enabled to be imparted by the indicator.

The high degrees of selectivity and of sensitivity which I am enabled to secure are due in large part to the design of the resonator detector device of my invention. The invention contemplates the design of a resonator detector device whose physical characteristics involve a rugged construction, minimum number of moving parts unaffected by ambient factors, and the embodiment of the device in a self-contained unit of small compass; and whose electrical characteristics involve the arrangement of the composite parts to constitute a resonant circuit having a high degree of stability and a high value of Q.

As the effective circuit Q is increased sensitivity of the device is likewise proportionately increased. Sensitivity of the system may be roughly defined as the output current produced for a given gas pressure per square foot at the diaphragm. A value of Q greater than 1,000 may easily be obtained for the resonator detector device of my invention. One reason for this large value of Q is the complete absence of insulating material in the electrostatic field; also the relatively large diameter of the conductors 10 and 36, enabling comparatively large spacing of the conductor elements 10a and 10b and 36a and 36b, is very helpful in decreasing the resistance of the resonant circuit. Other losses that occur in a resonant circuit are the losses that are induced by the capacity and proximity effects. The design of my resonator detector results in a low distributed capacity without any dielectric in its field. The losses due to the proximity of one conductor carrying current to another will likewise be low due to the large spacing of the conductor elements of the conductors 10 and 36.

The use of heat resisting material such as invar for the elements 1 and 9 with a coating of copper or silver will assist in accomplishment of the results desired. The invar will prevent the change of constants, inductance and capacity, thus preventing the operating point from shifting. The use of silver or copper will give the resonator circuit a low resistance and thereby assist in increasing the Q of the circuit.

The operating capacity of the resonator detector may be considered as that capacity formed by the diaphragm 7 and the end 9b of the element 9. The tuning of the resonant circuit is accomplished by this capacity in conjunction with the distributed capacity, characteristic of the construction of the device, to constitute its total tuning capacity. One consideration conducive to the high sensitivity of the device of my invention is that the working capacity is large in comparison to the distributed capacity. The distributed capacity of a typical resonator device of my invention would be of the order of one micromicrofarad, while the operating capacity would be of the order of ten to forty micromicrofarads. The relatively small distributed capacity is of no consequence.

The other consideration is to have the working capacity of such a size and shape as to give a maximum of sensitivity. From an examination of Figure 2 it may be seen that the variation of capacity must not be so great as to cause the impedance variations to work over a greater portion of the curve 50 than is indicated by b, constituting the straight-line portion of the curve. To work over a greater portion than this straight line portion of the curve would introduce non-linearity.

The construction of the resonator-detector device of my invention will permit the use of diaphragms of different thicknesses and materials and will allow the use of a diaphragm that will vary the working capacity by just the right amount in such a manner that the greatest explosive pressure will cause a variation of the working capacity to just complete a variation of impedance equivalent to the length of line f, Figure 2, so that operating range is confined to the straight line portion b of the curve 50, in which range the device has substantially the same degree of sensitivity for the entire range of frequencies covered thereby.

An important feature of the resonator detector device of my invention resides in the fact that it has its electrical field confined entirely within the housing 1. It is fed by means of loop 15 and the loop formed by the end of the wire 10a at either 34 or 35 and by a concentric cable 10 which in itself is entirely inclosed. The housing 1 is so designed as to produce good mechanical stability and a high value of Q for the resonator circuit.

Having now described my invention and the manner in which the same may be used, what I claim as new and desire to secure by Letters Patent is:

1. In pressure translating means of the class described, in combination, a resonant electrical circuit comprising a cylindrical housing element, a pressure responsive diaphragm associated therewith, a capacity element mounted within said housing and having a part engaging said housing in direct electrical contact therewith, said capacity element also having a part spaced from said housing within the same and capacitively and inductively associated therewith, one end of said latter part being positioned adjacent to but spaced from said diaphragm in capacitive relation thereto, the first mentioned part of said capacity element comprising a head having a diameter corresponding substantially with the inner diameter of said housing and associated therewith, a plurality of insulated passages through said head, an input conductor extending through one of said passages and conductively associated with the second mentioned part, and an output conductor extending through the other of said passages and conductively associated with said second mentioned part.

2. In pressure translating means of the class described, in combination, a resonant electrical circuit comprising a cylindrical housing element, a pressure responsive diaphragm associated therewith, a capacity element mounted within said housing and having a part engaging said housing in direct electrical contact therewith, said capacity element also having a part spaced from said housing within the same and capacitively and inductively associated therewith, one end of said latter part being positioned adjacent to but spaced from said diaphragm in capacitive relation thereto, the first mentioned part of said capacity element comprising a head having a diameter corresponding substantially with the inner diameter of said housing and associated therewith, a plurality of insulated passages through said head, an alternating current input to said resonant circuit comprising a concentric line, one lead of which is conductively associated with said first mentioned part of said capacity element, the other lead of said input extending through one of said insulated passages and conductively associated with the second mentioned part of said capacity element, and an output from said resonant circuit comprising a concentric line, one lead of which is conductively associated with the first mentioned part of said capacity element, the other lead of said output extending through the other passage and conductively associated with the second mentioned part of said capacity element.

3. In pressure translating means of the class described, in combination, a resonant electrical circuit comprising a cylindrical housing element, a pressure responsive diaphragm associated therewith, a capacity element mounted within said housing and having a part engaging said housing in direct electrical contact therewith, said capacity element also having a part spaced from said housing within the same and capacitively and inductively associated therewith, one end of said latter part being positioned adjacent to but spaced from said diaphragm in capacitive relation thereto, and means for adjusting said capacity element within said housing to different fixed positions relative to said diaphragm for varying the capacity of said resonant circuit.

4. In pressure translating means of the class described, in combination, a resonant electrical circuit comprising a cylindrical housing element, a pressure responsive diaphragm associated therewith, a capacity element mounted within said housing and having a part engaging said housing in direct electrical contact therewith, said capacity element also having a part spaced from said housing within the same and capacitively and inductively associated therewith, one end of said latter part being positioned adjacent to but spaced from said diaphragm in capacitive relation thereto, said first mentioned part of said capacity element having threaded connection with said housing for adjustment of the capacity element relative thereto and relative to said diaphragm for varying the capacity of said resonant circuit.

5. In pressure translating means of the class described, in combination, a resonant electrical circuit comprising a cylindrical housing element, a pressure responsive diaphragm associated therewith, a capacity element mounted within said housing in operative relation to said diaphragm and inductively and capacitively associated with said housing and said diaphragm, and means for adjusting said capacity element within said housing to different fixed positions relative to said diaphragm for varying the capacity of said resonant circuit.

STEPHEN D. LAVOIE.